United States Patent
Chen et al.

(10) Patent No.: US 10,414,665 B2
(45) Date of Patent: Sep. 17, 2019

(54) SYNTHESIS OF AFX ZEOLITE

(71) Applicant: Johnson Matthey Public Limited Company, London (GB)

(72) Inventors: Hai-Ying Chen, Wayne, PA (US); Joseph Fedeyko, Wayne, PA (US); Trong Pham, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/718,018

(22) Filed: Sep. 28, 2017

(65) Prior Publication Data

US 2018/0093897 A1    Apr. 5, 2018

Related U.S. Application Data

(60) Provisional application No. 62/402,659, filed on Sep. 30, 2016.

(51) Int. Cl.

| | |
|---|---|
| *C01B 39/48* | (2006.01) |
| *B01J 29/70* | (2006.01) |
| *B01J 29/76* | (2006.01) |
| *B01D 53/94* | (2006.01) |
| *B01J 35/04* | (2006.01) |
| *C01B 39/02* | (2006.01) |
| *B01J 35/00* | (2006.01) |

(52) U.S. Cl.
CPC ............... *C01B 39/48* (2013.01); *B01J 29/70* (2013.01); *B01J 29/76* (2013.01); *B01J 35/04* (2013.01); *C01B 39/026* (2013.01); *B01D 53/9418* (2013.01); *B01D 2255/20738* (2013.01); *B01D 2255/20761* (2013.01); *B01D 2255/50* (2013.01); *B01D 2255/9155* (2013.01); *B01D 2255/9202* (2013.01); *B01J 35/002* (2013.01); *B01J 2229/186* (2013.01); *C01P 2002/72* (2013.01); *C01P 2004/30* (2013.01); *C01P 2004/42* (2013.01); *C01P 2004/61* (2013.01); *C01P 2004/62* (2013.01)

(58) Field of Classification Search
CPC ..... C01B 39/48; C01B 39/54; C01P 2002/72; C01P 2004/30; C01P 2004/42; C01P 2004/61; C01P 2004/62
See application file for complete search history.

(56) References Cited

U.S. PATENT DOCUMENTS

| | | |
|---|---|---|
| 2012/0308439 A1 | 12/2012 | Chen et al. |
| 2015/0367336 A1 | 12/2015 | Trukhan et al. |
| 2016/0096169 A1 | 4/2016 | Rivas-Cardona et al. |
| 2016/0137518 A1* | 5/2016 | Rivas-Cardona ............ B01D 53/9413 423/706 |

OTHER PUBLICATIONS

Archer et al, "Imidazolium structure directing agents in zeolite synthesis: Exploring guest/host relationships in the synthesis of SSZ-70", Microporous and Mesoporous Materials, vol. 130, pp. 255-265 (May 2010) (Year: 2010).*

Wang et al.; Hollow nanocrystals of silicoaluminophosphate molecular sieves synthesized by an aminothermal co-templating strategy; CrystEngComm 2016, 18, 1000-1008.

Turrina et al.; Retrosynthetic Co-Templating Method for the Preparation of Silicoaluminophosphate Molecular Sieves; Chem. Mater. 2016, 28, 4998-3012.

* cited by examiner

Primary Examiner — David M Brunsman

(57) ABSTRACT

An alkali-free H-AFX zeolite and synthesis procedure are disclosed, as well the use of such zeolite as a catalyst in an SCR process.

15 Claims, 3 Drawing Sheets

XRD patterns of as-made and calcined H-AFX prepared using isopropylamine in example 1

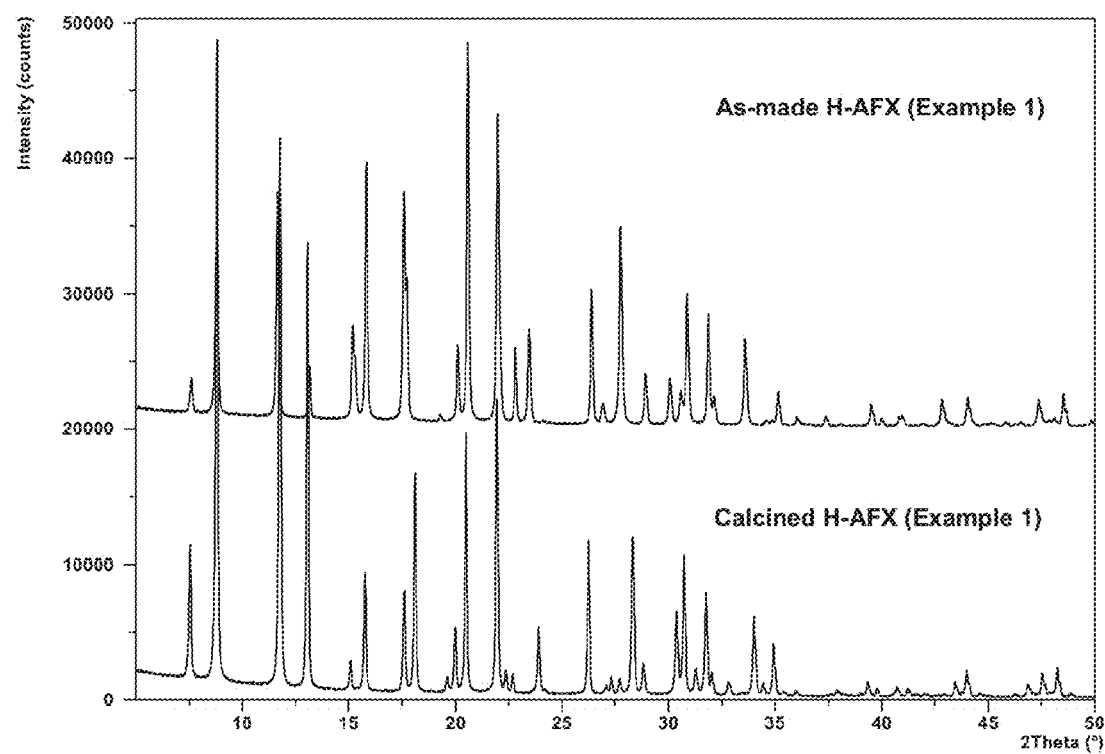
Figure 1. XRD patterns of as-made and calcined H-AFX prepared using isopropylamine in example 1
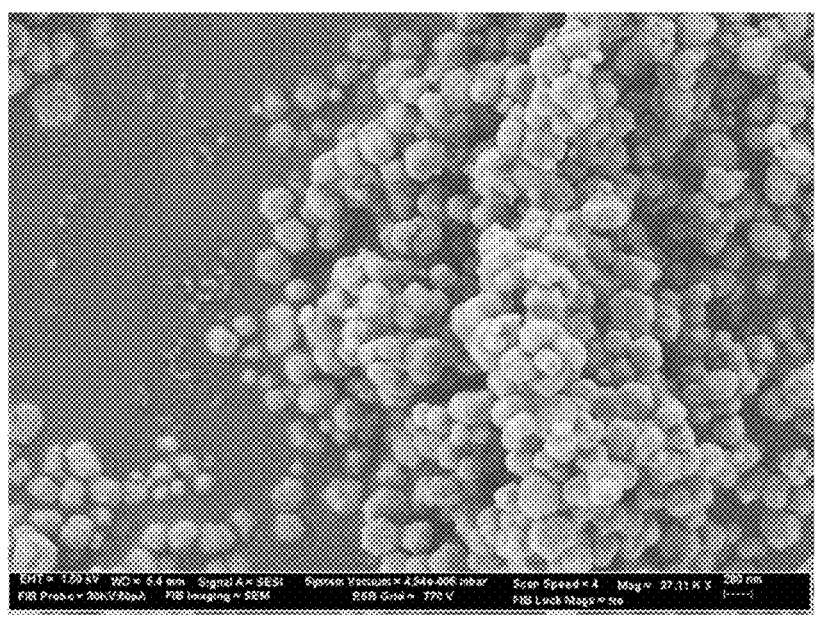
Figure 2. SEM image of H-AFX prepared using isopropylamine as 2nd SDA

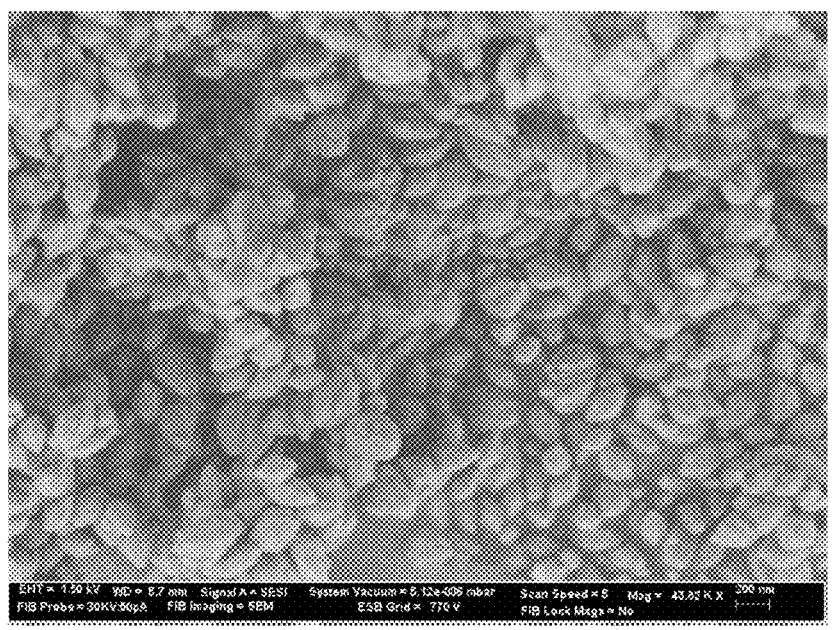
Figure 3. SEM image of H-AFX prepared using pyrrolidine as 2$^{nd}$ SDA
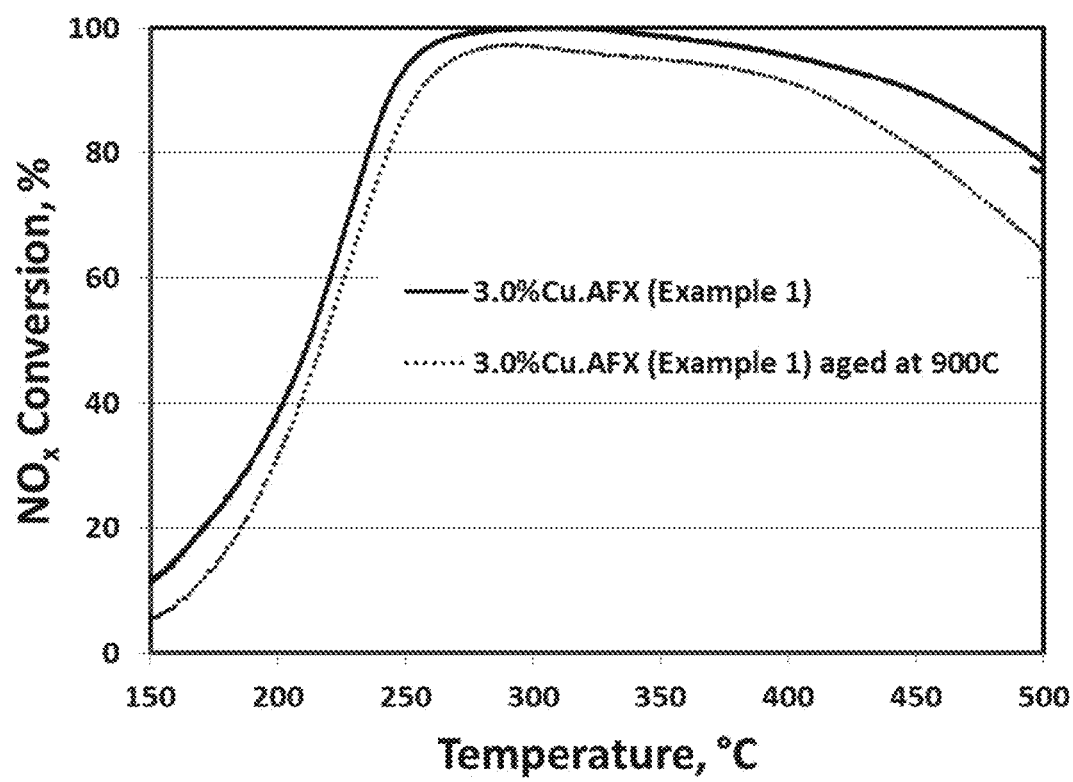
Figure 4

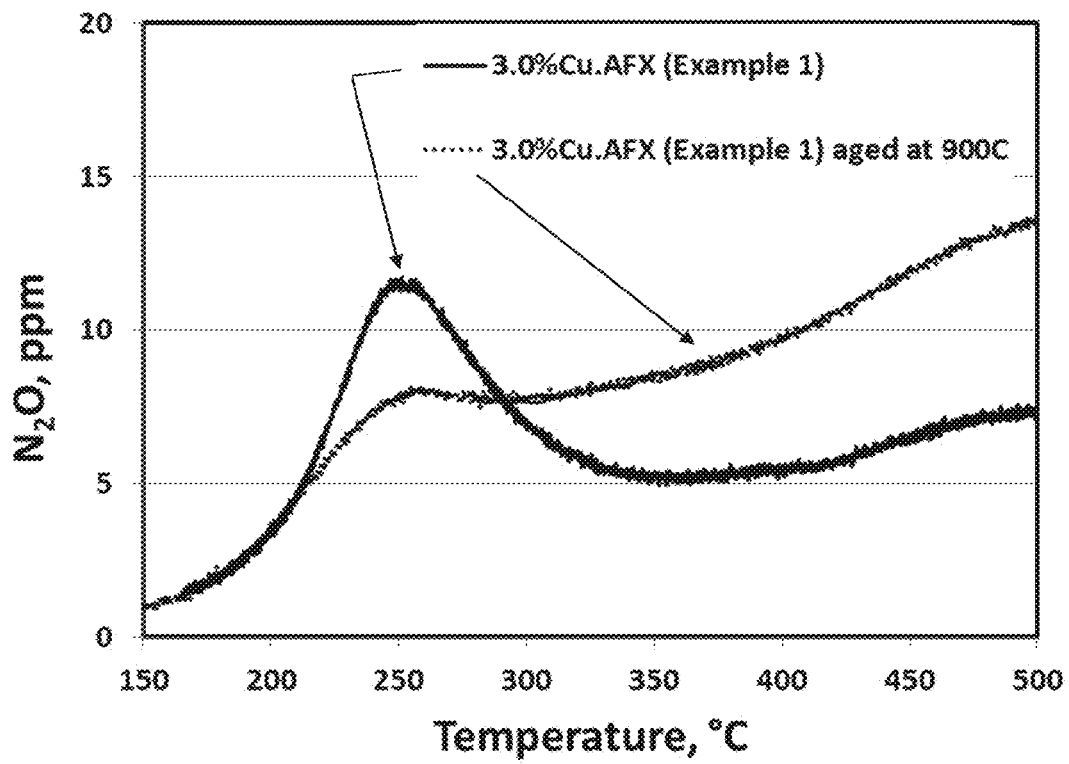
Figure 5
Figure 6
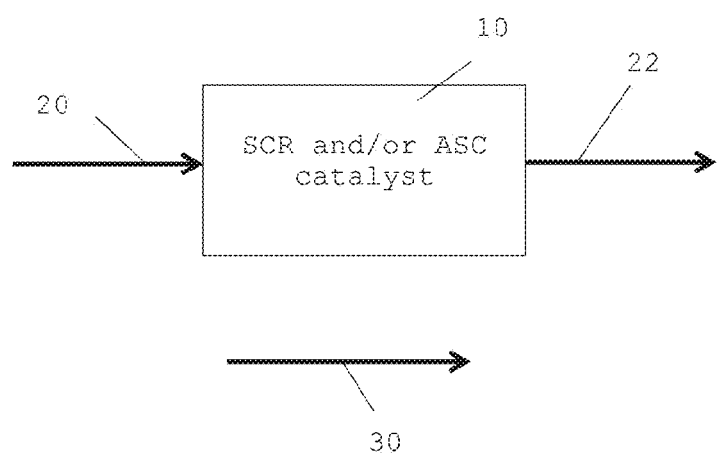

SYNTHESIS OF AFX ZEOLITE

CROSS REFERENCE TO RELATED APPLICATIONS

This application claims priority to U.S. Provisional Application No. 62/402,659, filed Sep. 30, 2016.

FIELD OF INVENTION

The present invention relates to synthesis of hydrogen-form zeolites having an AFX framework (H-AFX). The invention also relates to their use as a catalyst.

BACKGROUND

Zeolites are porous crystalline or quasi-crystalline aluminosilicates constructed of repeating $SiO_4$ and $AlO_4$ tetrahedral units. These units are linked together to form frameworks having regular intra-crystalline cavities and channels of molecular dimensions. Numerous types of synthetic zeolites have been synthesized and each has a unique framework based on the specific arrangement of its tetrahedral units. By convention, each framework type is assigned a unique three-letter code (e.g., "AFX") by the International Zeolite Association (IZA).

AFX frameworks incorporate both an AFT-cage structure and a GME-cage structure. When combined, the AFT and GME-cages form the unique AFX crystalline structure. Conventional synthesis techniques for AFX zeolites involve the use of Na-GME zeolites to directly provide the GME portion of the crystal, and a structure directing agent (SDA), also referred to as a "template" or "templating agent" to form the AFT portion of the crystal. SDAs are typically complex organic molecules that guide or direct the molecular shape and patter of the zeolite's framework. Generally, the SDA serves to position hydrated silica and alumina as a mold around which the zeolite crystals form. After the crystals are formed, the SDA can be removed from the interior structure of the crystals, leaving a molecularly porous aluminosilicate cage.

Zeolites have numerous industrial applications including the catalytic treatment of exhaust gas from combustion of hydrocarbon fuels, such as internal combustion engines, gas turbines, coal-fired power plants, and the like. To improve catalytic performance, zeolites are frequently loaded with a transition metal, such as copper. In one example, a metal loaded zeolite can catalytically reduce the concentration of nitrogen oxides ($NO_x$) in the exhaust gas via a selective catalytic reduction (SCR) process.

Sodium (Na) has two detrimental impacts on the synthesis and the final product. First, the presence of Na can lead to various impurities in the final product. These impurities can at times dominate the crystalline batch or may contain rod-like crystals which may pose health hazards. Additionally, for SCR catalysts, the presence of residual Na can impact both the exchange of Cu and the durability of the final catalyst product to high temperatures in excess of 800° C., where the formation of Na aluminates can collapse the structure. Also, the presence of Na typically results in lower SAR materials that are more sensitivity to hydrothermal aging. Accordingly, there remains a need to avoid these issues associated with the presence of alkali in the synthesis. This invention satisfies these needs amongst others.

SUMMARY

Applicants have found a unique series of hydrogen-form zeolites (H-zeolites) which are referred to herein as "JMZ-10 zeolite" or "JMZ-10". This zeolite material contains the AFX framework structure as the primary phase, and a template and is essentially free of alkali metal cations, such as sodium. In contrast to conventional AFX zeolite synthesis, which uses alkali metal ions, it has been found that alkali-free AFX zeolites can be synthesized using a combination of two SDAs. More specifically, it has been found that AFX zeolites can be synthesized using a first SDA for the AFT-cage and an organic amine as a second SDA for the GME-cage.

According to certain aspects of the invention, JMZ-10 is a novel composition comprising a synthetic hydrogen-form zeolite having an AFX framework as the primary crystalline phase, wherein said zeolite contains a template and is essentially free of alkali metal ions. JMZ-10 zeolite can have round or elliptical morphology compared to conventional AFX zeolites which have a hexagonal bifrustum morphology.

These H-form AFX zeolites can undergo further processing to form a metal-loaded zeolite, such as copper-AFX, which can be used as a catalyst. Accordingly, in another aspect of the invention, provided is a catalyst composition comprising a synthetic zeolite having an AFX framework as the primary crystalline phase and a silica-to-alumina ratio of about 10 to about 50, wherein the zeolite has 0.1 to 7 weight percent exchanged transition metal and wherein the zeolite is essentially free of alkali metal. Preferred transition metals include copper and/or iron.

In another aspect of the invention, provided is a method for producing a hydrogen-form AFX zeolite comprising the steps of (a) preparing an admixture containing (i) at least one source of alumina, (ii) at least one source of silica, (iii) a first structure directing agent (SDA) in hydroxide form suitable for forming an AFT cage, and (iv) a second structure directing agent consisting of a neutral organic amine, wherein the admixture is essentially free of alkali metals; and (b) heating the admixture under autogenous pressure at a temperature and with stirring or mixing for a sufficient time to crystallize hydrogen-form zeolite crystals having an AFX framework. Preferably, the second SDA is suitable for forming a GME cage. An SDA is suitable for forming an AFT cage or a GME cage as determined by either its use in the literature or by calculation of the energetics of the SDA in the AFT cage In another aspect of the invention, provided is a catalyst article for treating exhaust gas comprising a catalyst composition described herein, wherein the catalyst composition is disposed on and/or within a honeycomb monolith substrate.

And in yet another aspect of the invention, provided is a method for treating an exhaust gas comprising contacting a combustion exhaust gas containing $NO_x$ and/or $NH_3$ with a catalyst article described herein to selectively reduce at least a portion of the $NO_x$ into $N_2$ and $H_2O$ and/or oxidize at least a portion of the $NH_3$.

BRIEF DESCRIPTION OF THE DRAWINGS

FIG. 1 is an XRD pattern of an as-made H-AFX zeolite according to one aspect of the invention.

FIGS. 2 and 3 are SEM images of H-AFX zeolite according to an aspect of the invention.

FIG. 4 is NOx conversion data using a catalyst containing an AFX-zeolite preparing according to one aspect of the invention;

FIG. 5 is $N_2O$ production data using a catalyst containing an AFX-zeolite preparing according to one aspect of the invention; and FIG. 6 is a diagram showing an AFX-zeolite preparing according to one aspect of the invention as an SCR and/or ASC catalyst.

DETAILED DESCRIPTION

In general, JMZ-10 zeolites are aluminosilicates having an AFX framework structure as the primary crystalline phase and are essentially free of alkali metal ions.

As used herein, the term "AFX" refers to an AFX crystalline structure as that code is recognized by the International Zeolite Association (IZA) Structure Commission. Aluminosilicates zeolites having an AFX framework as the primary crystalline phase means that the zeolite crystal comprises at least about 70 wt. %, preferably at least about 80 wt. %, more preferably at least about 90 wt. %, even more preferably at least about 95 wt. %, or most preferably at least about 99 wt. %, of AFX aluminosilicate framework, based on the total weight of aluminosilicate in the zeolite material. Preferably, any secondary crystalline phase comprises less than about 10 weight percent of the zeolite material, more preferably less than about 5 weight percent, and even more preferably less than about 2 weight percent.

As used herein, the term "essentially free of metal ions" means that alkali, alkaline-earth, and transition metal ions (other than aluminum) or sources thereof are not added as an intentional ingredient to the reaction admixture that is used to synthesize the zeolite crystals, and that if any alkali or alkaline earth metal ions are present in the zeolite, these metal ions are only present only in an amount that is inconsequential to the intended catalytic activity of the zeolite.

In certain examples of the invention, the JMZ-10 zeolite contains less than about 0.1, preferably less than about 0.01, and more preferably less than about 0.001 weight percent of non-aluminum metal ions, based on the total weight of the zeolite.

In certain examples of the invention, the JMZ-10 zeolite contains less than about 0.1, preferably less than about 0.01, and more preferably less than about 0.001 weight percent of alkaline-earth metal ions, based on the total weight of the zeolite.

In certain examples of the invention, the JMZ-10 zeolite contains less than about 0.1, preferably less than about 0.01, and more preferably less than about 0.001 weight percent of transition metal ions, based on the total weight of the zeolite.

In certain examples of the invention, the JMZ-10 zeolite contains less than about 0.1, preferably less than about 0.01, and more preferably less than about 0.001 weight percent of copper metal ions, based on the total weight of the zeolite.

As used herein, the term "essentially free of alkali metal" means that alkali metals (ions or otherwise) or sources thereof are not added as an intentional ingredient to the reaction admixture that is used to synthesize the zeolite crystals, and that if any alkali or alkaline earth metal ions are present in the zeolite, these metal ions are only present only in an amount that is inconsequential to the intended catalytic activity of the zeolite.

In certain examples of the invention, the JMZ-10 zeolite contains less than about 0.1, preferably less than about 0.01, and more preferably less than about 0.001 weight percent of alkali metal, based on the total weight of the zeolite.

In certain examples of the invention, the JMZ-10 zeolite contains less than about 0.1, preferably less than about 0.01, and more preferably less than about 0.001 weight percent of sodium metal ions, based on the total weight of the zeolite.

When used as a catalyst, the JMZ-10 zeolite can include one or more post-synthesis, exchanged metals, typically in the form of metal ions and/or metal oxides. These post-synthesis exchanged metals are not part of the zeolite framework and are not present during zeolite synthesis (i.e., crystal formation). Exchanged metals include noble metals, such as gold and silver; platinum group metals, including platinum, palladium, rhodium, and ruthenium; transition metals, such as copper, iron, vanadium, manganese, and nickel; and alkaline-earth metals such as calcium. Of these, transition metals are particularly preferred, with copper and iron being preferred transition metals.

The method of exchange is not necessarily limited, but ion-exchange is a preferred method of loading metal onto the zeolite. Typically, a metal-exchanged JMZ-10 zeolite contains from about 0.1 to about 7 weight percent of an exchanged metal based on the total weight of the zeolite, particularly when the exchanged metal is copper or iron. Other metal loading ranges include from about 1 to about 6 weight percent, such as from about 2 to about 4 weight percent.

As used herein the terms "aluminosilicate zeolite" and "zeolite" are used interchangeably and mean a synthetic aluminosilicate molecular sieve having a framework constructed repeating $SiO_4$ and $AlO_4$ tetrahedral units, and preferably having a molar silica-to-alumina ratio (SAR) of at least 22, for example about 24 to about 40.

The zeolites of the present invention are not silicoaluminophosphates (SAPOs) and thus do not have an appreciable amount of phosphorous in their framework. That is, the zeolite frameworks do not have phosphorous as a regular repeating unit and/or do not have an amount of phosphorous that would affect the basic physical and/or chemical properties of the material, particularly with respect to the material's capacity to selectively reduce $NO_x$ over a broad temperature range. Preferably, the amount of framework phosphorous is less than 0.1 weight percent, more preferably less than 0.01 or even more preferably less than 0.001 weight percent, based on the total weight of the zeolite.

Zeolites, as used herein, are free or substantially free of framework metals, other than aluminum. Thus, a "zeolite" and a "metal-exchanged zeolite" are distinct from a "metal-substituted zeolite" (also referred to as "isomorphous substituted zeolite"), wherein the latter comprises a framework that contains one or more non-aluminum metals substituted into the zeolite's framework. Preferably, the JMZ-10 zeolite does not contain framework non-aluminum transition metals in an appreciable amount, e.g., less than about 10 ppm based on the total number of aluminum atoms in the crystal framework. Any post-synthesis metal loaded on the zeolite is preferably present as an ionic species within the interior channels and cavities of the zeolite framework.

In general, JMZ-10 zeolites are synthesized by preparing an admixture that is essentially free of alkali metals (including alkali metal ions) and that contains at least one source of alumina, at least one source of silica, at least SDA in hydroxide form for forming a AFT cage structure, and at least one neutral organic amine SDA for forming a GME cage structure. The admixture can also contain water. The admixture is preferably free from additional sources of hydroxide ions. The admixture is treated under conditions to crystallize hydrogen-form zeolite crystals having an AFX framework and containing an SDA.

Typical alumina sources also are generally known and include synthetic faujasites, aluminates, alumina, other zeolites, aluminum colloids, boehmites, pseudo-boehmites, aluminum hydroxides, aluminum salts such as aluminum sulfate and alumina chloride, aluminum hydroxides and alkoxides, alumina gels. Particularly preferred are synthetic faujasites such as zeolite Y. Preferred zeolite Y materials have a silica-to-alumina ratio (SAR) of about 10 to about 100, preferably about 12 to about 60.

Preferably, the source of alumina and the source of silica are both synthetic faujasite (FAU). The synthetic faujasite can be single type of FAU zeolite or a mixture of two or more FAU zeolites.

Silica sources resulting in a high relative yield, i.e. greater than 50% are preferred. Suitable silica sources include, without limitation, synthetic faujasites, fumed silica, silicates, precipitated silica, colloidal silica, silica gels, dealuminated zeolites, silicon alkoxides, and silicon hydroxides. Particularly preferred are synthetic faujasites such as zeolite Y. Preferred zeolite Y materials have a silica-to-alumina ratio (SAR) of about 10 to about 100, preferably about 12 to about 60.

Suitable SDAs for directing AFX synthesis include 1,3-Bis(1-adamantyl) imidazolium (BAI) in combination with at least one neutral organic amine is selected from isopropylamine, propylamine, ethanolamine, ethylmethylamine, ethylenediamine, pyrrolidine, and trimethylamine. Preferably, the BAI is in hydroxide form. Preferably, the reaction admixture and the resulting AFX zeolite are essentially free of non-hydroxide anions including halogen, e.g., fluoride, chloride, bromide and iodide, as well as acetate, sulfate, tetrafluoroborate, and carboxylate.

Suitable ratios for BAI to the neutral organic amine range from about 0.2 to 2, such as about 0.2 to 1, or about 1 to 2.

Methods of the present invention unexpectedly have a relative yield on silica of greater than about 50%, greater than about 70%, greater than about 80%, or greater than about 90%. Inventors have found that the present synthesis methods result in a high relative yield on silica and/or SDA in an AFX zeolite synthesis process. As used herein, the term "relative yield" with respect to a chemical reactant, means the amount of the reactant (or derivative thereof) that is incorporated into a desired product as a fraction of the total amount of reactant introduced into the chemical process. Thus, the relative yield of a reactant can be calculated as follows:

(Relative Yield)$R=(R_P)/(R_T)$ where R is the reactant, $R_P$ is the total weight of reactant R (or derivative thereof) incorporated into the desired product, and $R_T$ is total weight of reactant R introduced into the chemical process. Here, the relative yield serves to measure the effectiveness of the chemical process in utilizing the reactant. Here, "relative yield" is not synonymous with the term "overall relative yield" which means the relative yield for a chemical process as a whole, including for example, multiple sequential zeolite synthesis batch reactions. Thus, the overall relative yield on silica represents the total amount of silica that is incorporated into the total amount of zeolite produced across one or more sequential batches (vis-à-vis the amount of silica remaining in a discarded mother liquor) relative to the total amount of silica introduced into the process as a whole. The total amounts of these materials typically correspond to the material's total weight.

The H-AFX synthesis is preferably conducted by combining predetermined relative amounts of the silica source, aluminum source, the SDAs, and other components such as water, under various mixing and heating regimens as will be readily apparent to those skilled in the art. Seed crystals, such as AFX zeolite, can also be included in the admixture. JMZ-10 can be prepared from a reaction mixture having the composition shown in Table 3 (shown as molar ratios). The reaction mixture can be in the form of a solution, gel, or paste. Silicon- and aluminum-containing reactants are expressed as $SiO_2$ and $Al_2O_3$, respectively.

TABLE 3

| Ratios | Typical | Preferred |
| --- | --- | --- |
| $SiO_2/Al_2O_3$ | 18-70 | 22-50 |
| $OH/SiO_2$ | 0.15-0.5 | 0.2-0.4 |
| $SiO_2/BAl$ | 2-7 | 2.5-5 |
| $H_2O/SiO_2$ | 15-40 | 20-30 |
| BAl/amine | 0.1-3 | 0.2-2 |
| alkali metal/$SiO_2$ | 0 | 0 |

Reaction temperatures, mixing times and speeds, and other process parameters that are suitable for conventional AFX synthesis techniques are also generally suitable for the present invention. The following synthesis steps can be followed to synthesize JMZ-10. An aluminum source and a silica source (for example, one or more zeolite Y materials, each with a SAR of about 10 to about 60) are mixed in water and combined with BAI-OH and a neutral organic amine selected from isopropylamine, propylamine, ethanolamine, ethylmethylamine, ethylenediamine, pyrrolidine, cyclopropylamine, trimethylamine, and trimethylamine N-oxide. The components are mixed by stirring or agitation until a homogeneous mixture is formed. Hydrothermal crystallization is usually conducted under autogenous pressure, at a temperature of about 100 to 200° C. for a duration of several days, such about 1-20 days, preferably about 1-3 days.

At the conclusion the crystallization period, the resulting solids are separated from the remaining reaction liquid by standard mechanical separation techniques, such as vacuum filtration or centrifugation. The recovered solids are then rinsed with deionized water, and dried at an elevated temperature (e.g., 75-150° C.) for several hours (e.g., about 4 to 24 hours). The drying step can be performed under vacuum or at atmospheric pressure.

The dried JMZ-10 crystals are preferably calcined to form H-form AFX, which does not contain an SDA, but can also be used without calcination.

It will be appreciated that the foregoing sequence of steps, as well as each of the above-mentioned periods of time and temperature values, are merely exemplary and can be varied.

The JMZ-10 zeolite is useful as a catalyst in certain applications, preferably with a post-synthesis metal exchange wherein one or more catalytic metals is exchanged into the channels and/or cavities of the zeolite. Preferably the post-synthesis metal exchange is a post-synthesis ion exchange. Examples of metals that can be post-zeolite synthesis exchanged or impregnated include transition metals, including copper, nickel, zinc, iron, tungsten, molybdenum, cobalt, titanium, zirconium, manganese, chromium, vanadium, niobium, as well as tin, bismuth, and antimony; noble metals including platinum group metals (PGMs), such as ruthenium, rhodium, palladium, indium, platinum, and precious metals such as gold and silver; alkaline earth metals such as beryllium, magnesium, calcium, strontium, and barium; and rare earth metals such as lanthanum, cerium, praseodymium, neodymium, europium, terbium, erbium, ytterbium, and yttrium. Preferred transition metals for post-synthesis exchange are base metals, and preferred base metals include those selected from the group consisting of copper, iron, manganese, vanadium, nickel, and mixtures thereof. Metals incorporated post-synthesis can be added to the molecular sieve via any known technique such as ion exchange, impregnation, isomorphous substitution, etc. The amount of metal post-synthesis exchanged can be from about 0.1 to about 7 weight percent, for example about 2 to about 5 weight percent, based on the total weight of the zeolite.

The metal-containing zeolite can contain post-synthesis exchanged alkaline earth metal, particularly calcium and/or magnesium, disposed within the channels and/or cavities of the zeolite framework. Thus, the metal-containing zeolite of the present invention can have transition metals ($T_M$), such as copper or iron, incorporated into the zeolite channels and/or cavities during synthesis and have one or more exchanged alkaline earth metals ($A_M$), such as calcium or potassium, incorporated post-synthesis. The alkaline earth metal can be present in an amount relative to the transition metal that is present. For example, $T_M$ and $A_M$ can be present, respectively, in a molar ratio of about 15:1 to about 1:1, about 10:1 to about 2:1, about 10:1 to about 3:1, or about 6:1 to about 4:1, particularly were $T_M$ is copper and $A_M$ is calcium. Preferably, the relative cumulative amount of transition metal ($T_M$) and alkaline earth metal ($A_M$) can be present in the zeolite material in an amount relative to the amount of aluminum in the zeolite, namely the framework aluminum. As used herein, the ($T_M+A_M$):Al ratio is based on the relative molar amounts of $T_M+A_M$ to molar framework Al in the corresponding zeolite. The catalyst material can have a ($T_M+A_M$):A ratio of not more than about 0.6. Preferably, the ($T_M+A_M$):A ratio is not more than 0.5, for example about 0.05 to about 0.5, about 0.1 to about 0.4, or about 0.1 to about 0.2.

Ce can be post-synthesis impregnated into the JMZ-10, for example, by adding Ce nitrate to a copper promoted zeolite via a conventional incipient wetness technique. The cerium concentration in the catalyst material can be present in a concentration of at least about 1 weight percent, based on the total weight of the zeolite. Examples of preferred concentrations include at least about 2.5 weight percent, at least about 5 weight percent, at least about 8 weight percent, or at least about 10 weight percent, based on the total weight of the zeolite. Alternatively, about 1.35 to about 13.5 weight percent, about 2.7 to about 13.5 weight percent, about 2.7 to about 8.1 weight percent, about 2 to about 4 weight percent, about 2 to about 9.5 weight percent, or about 5 to about 9.5 weight percent, based on the total weight of the zeolite.

Preferably, the cerium concentration in the catalyst material is in the range of about 50 to about 550 g/ft$^3$, from about 75 to about 350 g/ft$^3$, from about 100 to about 300 g/ft$^3$, or from about 100 to about 250 g/ft$^3$. Alternatively, above 100 g/ft$^3$, above 200 g/ft$^3$, above 300 g/ft$^3$, above 400 g/ft$^3$, above 500 g/ft$^3$.

Where the catalyst is part of a washcoat composition, the washcoat can further comprise binder containing Ce or ceria. Here, the Ce containing particles in the binder are significantly larger than the Ce containing particles in the catalyst.

Applicants further discovered that the foregoing synthesis procedure permits adjusting the SAR of the catalyst based on the composition of the starting synthesis mixture. SARs of 10-50, 20-40, 30-40, 10-15, and 25-35, for example, can be selectively achieved based on the composition of the starting synthesis mixture and/or adjusting other process variables. The SAR of zeolites can be determined by conventional analysis. This ratio is meant to represent, as closely as possible, the ratio in the rigid atomic framework of the zeolite crystal and to exclude silicon or aluminum in the binder or, in cationic or other form, within the channels.

It will be appreciated that it can be extremely difficult to directly measure the SAR of zeolite after it has been combined with a binder material. Accordingly, the SAR has been expressed hereinabove in term of the SAR of the parent zeolite, i.e., the zeolite used to prepare the catalyst, as measured prior to the combination of this zeolite with the other catalyst components.

The foregoing synthesis procedure can result in zeolite crystals of uniform size and shape with relatively low amounts of agglomeration. In addition, the synthesis procedure can result in zeolite crystals having a mean crystalline size of about 0.1 to about 10 μm, about 0.1 to about 1 μm, about 0.1 to about 0.5 μm, or about 0.1 to about 0.4 μm. Alternatively, about 0.5 to about 5 μm, or about 1 to about 5 μm; or about 3 to about 7 μm and the like. Large crystals can be milled using a jet mill or other particle-on-particle milling technique to obtain a mean crystalline size of about 1.0 to about 1.5 micron to facilitate washcoating a slurry containing the catalyst to a substrate, such as a flow-through monolith. Alternatively, the crystals can be unmilled.

Crystal size is the length of one edge of a face of the crystal. The crystal size is based on individual crystals (including twinned crystals) but does not include agglomerations of crystals. Direct measurement of the crystal size can be performed using microscopy methods, such as SEM and TEM. Other techniques for determining mean particle size, such as laser diffraction and scattering can also be used. In addition to the mean crystal size, catalyst compositions preferably have a majority of the crystal sizes are greater than about 0.2 μm, about 0.5 or about 5 μm. Alternatively, about 0.7 to about 5 μm, about 1 to about 5 μm, about 1.5 to about 5.0 μm, about 1.5 to about 4.0 μm, about 2 to about 5 μm, or about 1 μm to about 10 μm.

Catalysts of the present invention are particularly applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. A washcoat containing the catalyst can be applied to an inert substrate, such as corrugated metal plate or a honeycomb cordierite brick. Alternatively, the catalyst is kneaded along with other components such as fillers, binders, and reinforcing agents, into an extrudable paste which is then extruded through a die to form a honeycomb brick. A catalyst article comprising a JMZ-10 catalyst described herein can be coated on and/or incorporated into a substrate.

Certain aspects of the invention provide a catalytic washcoat. The washcoat comprising the JMZ-10 catalyst described herein is preferably a solution, suspension, or slurry. Suitable coatings include surface coatings, coatings that penetrate a portion of the substrate, coatings that permeate the substrate, or some combination thereof.

A washcoat can also include non-catalytic components, such as fillers, binders, stabilizers, rheology modifiers, and other additives, including one or more of alumina, silica, non-zeolite silica alumina, titania, zirconia, ceria. The catalyst composition can comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc. Preferably, the washcoat loading is >0.3 g/in$^3$, >1.2 g/in$^3$, >1.5 g/in$^3$, >1.7 g/in$^3$ or >2.00 g/in$^3$, and preferably <3.5 g/in$^3$, or <2.5 g/in$^3$. Preferably, the washcoat is applied to a substrate in a loading of about 0.8 to 1.0 g/in$^3$, 1.0 to 1.5 g/in$^3$, or 1.5 to 2.5 g/in$^3$.

Two of the most common substrate designs are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as Al$_2$OsZFe, Al$_2$O$_3$/Ni or B$_4$CZFe, or composites comprising segments of any two or more thereof. Preferred materials include cordierite, silicon carbide, and alumina titanate.

Plate-type catalysts have lower pressure drops and are less susceptible to plugging and fouling than the honeycomb types, which is advantageous in high efficiency stationary applications, but plate configurations can be much larger and more expensive. A honeycomb configuration is typically smaller than a plate type, which is an advantage in mobile applications, but has higher pressure drops and plug more easily. Preferably, the plate substrate is constructed of metal, preferably corrugated metal.

The invention can be a catalyst article made by a process described herein. The catalyst article can be produced by a process that includes the steps of applying a JMZ-10 catalyst composition, preferably as a washcoat, to a substrate as a layer either before or after at least one additional layer of another composition for treating exhaust gas has been applied to the substrate. The one or more catalyst layers on the substrate, including the JMZ-10 catalyst layer, can be arranged in consecutive layers. As used herein, the term "consecutive" with respect to catalyst layers on a substrate means that each layer is contact with its adjacent layer(s) and that the catalyst layers as a whole are arranged one on top of another on the substrate.

The JMZ-10 catalyst can be disposed on the substrate as a first layer and another composition, such as an oxidation catalyst, reduction catalyst, scavenging component, or NO$_x$ storage component, can be disposed on the substrate as a second layer. Alternatively, the JMZ-10 catalyst can be disposed on the substrate as a second layer and another composition, such as such as an oxidation catalyst, reduction catalyst, scavenging component, or NO$_x$ storage component, is disposed on the substrate as a first layer. As used herein the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer. The second layer can be applied to an inert substrate as a bottom layer and the first layer is top layer that is applied over the second layer as a consecutive series of sub-layers. The exhaust gas can penetrate (and hence contacts) the first layer, before contacting the second layer, and subsequently returns through the first layer to exit the catalyst component. The first layer can be a first zone disposed on an upstream portion of the substrate and the second layer is disposed on the substrate as a second zone, wherein the second zone is downstream of the first.

The catalyst article can be produced by a process that includes the steps of applying a JMZ-10 catalyst composition, preferably as a washcoat, to a substrate as a first zone, and subsequently applying at least one additional composition for treating an exhaust gas to the substrate as a second zone, wherein at least a portion of the first zone is downstream of the second zone. Alternatively, the JMZ-10 catalyst composition can be applied to the substrate in a second zone that is downstream of a first zone containing the additional composition. Examples of additional compositions include oxidation catalysts, reduction catalysts, scavenging components (e.g., for sulfur, water, etc.), or NO$_x$ storage components.

To reduce the amount of space required for an exhaust system, individual exhaust components can be designed to perform more than one function. For example, applying an SCR catalyst to a wall-flow filter substrate instead of a flow-through substrate serves to reduce the overall size of an exhaust treatment system by allowing one substrate to serve two functions, namely catalytically reducing NO$_x$ concentration in the exhaust gas and mechanically removing soot from the exhaust gas. Accordingly, the substrate can be a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating patter. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, at least about 75%, at least about 80%, or at least about 90%. The efficiency can be in a range from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of at least about 30%, more preferably at least about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 µm, for example about 20 to about 30 µm, about to about 25 µm, about 10 to about 20 µm, about 20 to about 25 µm, about 10 to about 15 µm, and about 15 to about 20 µm.

In general, the production of an extruded solid body containing the JMZ-10 catalyst involves blending the JMZ-10 catalyst, a binder, an optional organic viscosity-enhancing compound into a homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. A JMZ-10 catalyst can also be washcoated or otherwise applied to the extruded solid body as one or more sub-layers that reside on the surface or penetrate wholly or partly into the extruded solid body.

Extruded solid bodies containing JMZ-10 catalysts according to the present invention generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked, e.g. with a suitable ceramic cement, and channels not blocked at the first, upstream end can also be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof. Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof.

Preferably, the JMZ-10 catalyst is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

The JMZ-10 catalyst described herein can promote the reaction of a reductant, preferably ammonia, with nitrogen oxides to selectively form elemental nitrogen ($N_2$) and water ($H_2O$). Thus, the catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2$)$_2$CO), ammonium carbonate, ammonium carbamate, ammonium hydrogen carbonate or ammonium formate.

The JMZ-10 catalyst described herein can also promote the oxidation of ammonia. Thus, the catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). The JMZ-10 catalyst can be disposed as a top layer over an oxidative under-layer, wherein the under-layer comprises a platinum group metal (PGM) catalyst or a non-PGM catalyst. Preferably, the catalyst component in the under-layer is disposed on a high surface area support, including but not limited to alumina.

An SCR and AMOX operations can be performed in series, wherein both processes utilize a catalyst comprising the JMZ-10 catalyst described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. Provided is a catalyst article having an ammonia slip catalyst disposed downstream of a selective catalytic reduction (SCR) catalyst. The ammonia slip catalyst can oxidize at least a portion of any nitrogenous reductant that is not consumed by the selective catalytic reduction process. For example, the ammonia slip catalyst can be disposed on the outlet side of a wall flow filter and an SCR catalyst is disposed on the upstream side of a filter. The ammonia slip catalyst can be disposed on the downstream end of a flow-through substrate and an SCR catalyst is disposed on the upstream end of the flow-through substrate. The ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

The SCR and/or AMOX process can be performed at a temperature of at least 100° C. The process(es) can occur at a temperature from about 150° C. to about 750° C. Preferably the temperature range is from about 175 to about 550° C. or from about 175 to about 400° C. Alternatively, the temperature range is about 450 to about 900° C., preferably about 500 to about 750° C., about 500 to about 650° C., about 450 to about 550° C., or about 650 to about 850° C. Temperatures greater than about 450° C. are particularly useful for treating exhaust gases from a heavy or light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_x$ compounds and/or oxidation of $NH_3$ in an exhaust gas, which comprises contacting the exhaust gas with a catalyst described herein in the presence of a reducing agent for a time sufficient to reduce the level of $NO_x$ compounds in the gas. These methods can further comprise one or more of the following steps: (a) accumulating and/or combusting soot that is in contact with the inlet of a catalytic filter; (b) introducing a nitrogenous reducing agent into the exhaust gas stream prior to contacting the catalyst in an SCR filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, can be used to oxidize particulate matter in particulate filter; and/or reduce the particulate matter (PM) in the exhaust gas; and (e) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

All or at least a portion of the nitrogen-based reductant, particularly $NH_3$, for consumption in the SCR process can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal can preferably be present at about 10 to about 200 $g/ft^3$, such as 20 to 60 $g/ft^3$. Alternatively, the precious metal of the catalyst can have an average concentration from about 40 to about 100 $grams/ft^3$.

Under certain conditions, during the periodically rich regeneration events, $NH_3$ can be generated over a $NO_x$ adsorber catalyst. The SCR catalyst downstream of the $NO_x$ adsorber catalyst can improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. The method can be treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the JMZ-10 catalyst described herein and at least one additional component for treating the exhaust gas, wherein the catalytic article and at least one additional component are designed to function as a coherent unit.

The system can comprise a catalytic article comprising a JMZ-10 catalyst described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3$/NO and 4:3 $NH_3/NO_2$.

The system can comprise an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. The oxidation catalyst can be adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal, such as platinum, palladium, or rhodium, or a combination thereof, coated on a flow-through monolith substrate. Preferably, the at least one platinum group metal is platinum, palladium or a combination of both platinum and palladium.

The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

A suitable filter substrate can be located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

The metal-promoted small pore JMZ-10 zeolite catalyst described herein can also be a passive NOx absorber (PNA) catalyst (i.e. it has PNA activity). Such catalyst can be prepared according to the method described in (also published as U.S. 2012308439) (both of which are hereby incorporated by reference), and the promoter metal can comprise a noble metal.

When the noble metal comprises, or consists of, palladium (Pd) and a second metal, then the ratio by mass of palladium (Pd) to the second metal is >1:1. More preferably, the ratio by mass of palladium (Pd) to the second metal is >1:1 and the molar ratio of palladium (Pd) to the second metal is >1:1. The aforementioned ratio of palladium relates to the amount of palladium present as part of the PNA catalyst. It does not include any palladium that may be present on the support material. The PNA catalyst can further comprise a base metal. Thus, the PNA catalyst can comprise, or consist essentially of, a noble metal, a small pore zeolite as described herein and optionally a base metal.

The base metal can be selected from the group consisting of iron (Fe), copper (Cu), manganese (Mn), chromium (Cr), cobalt (Co), nickel (Ni), zinc (Zn) and tin (Sn), as well as mixtures of two or more thereof. It is preferred that the base metal is selected from the group consisting of iron, copper and cobalt, more preferably iron and copper. Even more preferably, the base metal is iron.

Alternatively, the PNA catalyst can be substantially free of a base metal, such as a base metal selected from the group consisting of iron (Fe), copper (Cu), manganese (Mn), chromium (Cr), cobalt (Co), nickel (Ni), zinc (Zn) and tin (Sn), as well as mixtures of two or more thereof. Thus, the PNA catalyst may not comprise a base metal.

In general, it is preferred that the PNA catalyst does not comprise a base metal.

It can be preferable that the PNA catalyst is substantially free of barium (Ba), more preferably the PNA catalyst is substantially free of an alkaline earth metal. Thus, the PNA catalyst may not comprise barium, preferably the PNA catalyst does not comprise an alkaline earth metal.

Turning to FIG. 6, shown is an SCR and/or ASC catalyst 10, an exhaust gas 20, a purified gas 22, and a direction of flow through the SCR and/or ASC catalyst 30. The exhaust gas 20 has an inlet concentration of NO and/or $NO_2$ and the purified gas 22 has an outlet concentration of NO and/or $NO_2$ that is less than the inlet concentration. The purified gas 22 also has an outlet concentration of $N_2O$ that is less than the inlet concentration of NO and/or $NO_2$.

Although the description above contains many specifics, these are merely provided to illustrate the invention and should not be constructed as limitations of the invention's scope. It should be also noted that many specifics could be combined in various ways in a single or multiple embodiments. Thus it will be apparent to those skilled in the art that various modifications and variations can be made in the processes, catalysts, and methods of the present invention without departing from the spirit or scope of the invention.

EXAMPLES

Materials produced in the examples described below were characterized by one or more of the following analytic methods. Powder X-ray diffraction (PXRD) patterns were collected Bruker D8 powder diffractometer using a CuKα radiation (40 kV, 40 mA) at a step size of 0.02° and a 1 s per step between 5° and 40° (2θ). Scanning electron microscopy (SEM) images and chemical compositions by energy-dispersive X-ray spectroscopy (EDX) were obtained on an Auriga 60 CrossBeam (FIB/FE-SEM) microscope, operating at an acceleration voltage of 1.5-3 keV, and a current of 10 μA. The micropore volume and surface area were measured using $N_2$ at 77 K on a Micrometrics 3Flex surface characterization analyzer.

Reagents:

Zeolite Y (CBV720 (SAR-30-32) from Zeolyst), DI water, BAI-OH organic template (20% wt), isopropylamine (99%, Sigma), isopropylamine (Alfa, 98% wt), propylamine (Alfa, 98% wt), ethanolamine (Sigma, 98% wt), ethylmethylamine (Sigma, 97% wt), ethylenediamine (Sigma, 99% wt), pyrrolidine (Sigma, 99% wt), and trimethylamine (Sigma, 50% wt).

Example 1. Preparation of H-AFX Using BAI and Isopropylamine as Co-Templates 11.38 g of the BAI-OH molecule hydroxide was mixed with 4.68 g of water. Next, 2.16 g of zeolite Y (CBV 720) as both aluminum and silica sources was added under stirring for 5 minutes. Then, 0.57 g isopropylamine was added to the solution under stirring for another 5 minutes. The reaction was heated and rotated (45 rpm for 23 ml reactor) at 155° C. for 6 days. The solid product was separated by centrifugation and dried at 80° C. overnight.

The as-made AFX was calcined at 580° C./8 hours in air with ramping rate of 3° C./min.

Analysis of the as-made product by powder XRD indicated that the product had an AFX structure (FIG. 1). An SEM of JMZ-10, the as-made product, showed that the material has hexagonal prism morphology with crystal size of about 50 nm to about 300 nm (FIG. 2). The calcined material has a BET surface area ~650-700 $m^2/g$ and micropore volume ~0.27 $cm^3/g$. As-made H-AFX and calcined zeolites made from as-made H-AFX have a hexagonal crystal structure whose X-ray diffraction patterns show the characteristic lines shown in Tables 1 and 2 below and a and c cell parameters of (13.534 & 20.102) and (13.607 & 19.663) respectively:

TABLE 1

Crystal structure of as-made H-AFX (JMZ-10)

| No. | Pos. [°2θ] | d-spacing [Å] | Rel. Int. [%] | h k l |
|---|---|---|---|---|
| 1 | 7.62 | 11.60 | 8 | 1 0 0 |
| 2 | 8.81 | 10.03 | 49 | 1 0 1 |
| 3 | 11.67 | 7.58 | 52 | 1 0 2 |
| 4 | 13.15 | 6.73 | 11 | 1 1 0 |
| 5 | 15.18 | 5.83 | 20 | 2 0 0 |

TABLE 1-continued

Crystal structure of as-made H-AFX (JMZ-10)

| No. | Pos. [°2θ] | d-spacing [Å] | Rel. Int. [%] | h k l |
|---|---|---|---|---|
| 6 | 15.30 | 5.79 | 13 | 1 0 3 |
| 7 | 15.82 | 5.60 | 60 | 2 0 1 |
| 8 | 17.58 | 5.04 | 54 | 2 0 2 |
| 9 | 17.71 | 5.00 | 31 | 0 0 4 |
| 10 | 19.28 | 4.60 | 2 | 1 0 4 |
| 11 | 20.11 | 4.41 | 20 | 2 1 0 |
| 12 | 20.59 | 4.31 | 100 | 2 1 1 |
| 13 | 21.99 | 4.04 | 83 | 2 1 2 |
| 14 | 22.09 | 4.02 | 11 | 1 1 4 |
| 15 | 22.82 | 3.89 | 18 | 3 0 0 |
| 16 | 23.45 | 3.79 | 27 | 1 0 5 |
| 17 | 26.40 | 3.37 | 36 | 2 2 0 |
| 18 | 26.88 | 3.31 | 4 | 2 1 4 |
| 19 | 26.95 | 3.31 | 3 | 2 0 5 |
| 20 | 27.75 | 3.21 | 61 | 1 0 6 |
| 21 | 27.85 | 3.20 | 4 | 3 1 1 |
| 22 | 28.92 | 3.08 | 15 | 3 1 2 |
| 23 | 30.07 | 2.97 | 15 | 2 1 5 |
| 24 | 30.56 | 2.92 | 9 | 4 0 0 |
| 25 | 30.79 | 2.90 | 8 | 2 0 6 |
| 26 | 30.89 | 2.89 | 35 | 4 0 1 |
| 27 | 31.86 | 2.81 | 35 | 4 0 2 |

TABLE 2

Crystal structure of calcined H-AFX

| No. | Pos. [°2θ] | d-spacing [Å] | Rel. Int. [%] | h k l |
|---|---|---|---|---|
| 1 | 7.56 | 11.68 | 20 | 1 0 0 |
| 2 | 8.81 | 10.03 | 100 | 1 0 1 |
| 3 | 11.78 | 7.51 | 90 | 1 0 2 |
| 4 | 13.07 | 6.77 | 64 | 1 1 0 |
| 5 | 15.09 | 5.87 | 5 | 2 0 0 |
| 6 | 15.52 | 5.70 | 0 | 1 0 3 |
| 7 | 15.75 | 5.62 | 20 | 2 0 1 |
| 8 | 17.60 | 5.04 | 17 | 2 0 2 |
| 9 | 18.09 | 4.90 | 39 | 0 0 4 |
| 10 | 19.61 | 4.52 | 3 | 1 0 4 |
| 11 | 19.98 | 4.44 | 12 | 2 1 0 |
| 12 | 20.49 | 4.33 | 48 | 2 1 1 |
| 13 | 21.95 | 4.05 | 56 | 2 1 2 |
| 14 | 22.36 | 3.97 | 4 | 1 1 4 |
| 15 | 22.68 | 3.92 | 3 | 3 0 0 |
| 16 | 23.90 | 3.72 | 14 | 1 0 5 |
| 17 | 26.24 | 3.39 | 29 | 2 2 0 |
| 18 | 27.05 | 3.29 | 2 | 2 1 4 |
| 19 | 27.30 | 3.26 | 2 | 2 0 5 |
| 20 | 27.71 | 3.22 | 3 | 3 1 1 |
| 21 | 28.30 | 3.15 | 36 | 1 0 6 |
| 22 | 28.82 | 3.09 | 6 | 3 1 2 |
| 23 | 30.36 | 2.94 | 5 | 2 1 5 |
| 24 | 30.38 | 2.94 | 11 | 4 0 0 |
| 25 | 30.72 | 2.91 | 28 | 4 0 1 |
| 26 | 31.27 | 2.86 | 6 | 2 0 6 |
| 27 | 31.74 | 2.82 | 22 | 4 0 2 |

Example 2: Preparation of H-AFX Using BAI and Pyrrolidine as Co-Templates

H-AFX (SAR≈30) was prepared by a similar method as described in Example 1, in which pyrrolidine was used as the co-template. The final gel with molar composition of $H_2O:SiO_2:Al_2O_3:BAI\text{-}OH:Pyrrolidine = 24:1:0.033:0.2:0.3$ was rotated in the oven at 155° C. for 6 days. Analysis of the as made product by powder XRD indicated that the product had a AFX structure (not shown), and the sample has a hexagonal bipyramidal morphology (SEM image as shown in FIG. 3).

Examples 3-7: Preparation of H-AFX Using BAI and Other Amines as Co-Templates

H-AFX (SAR≈30) was prepared by a similar method as described in Example 1, in which amine listed in Table 4 was used as the co-template. The final gel molar compositions are summarized in Table 4 below.

TABLE 4

| Example | molar ratio $SiO_2$ | molar ratio $Al_2O_3$ | $1^{st}$ SDA (molar ratio) | $2^{nd}$ SDA Amine (molar ratio) | molar ratio $H_2O$ | SAR of product |
|---|---|---|---|---|---|---|
| 3 | 1 | 0.033 | BAI (0.2) | Propylamine (0.3) | 24 | 30 |
| 4 | 1 | 0.033 | BAI (0.2) | Trimethylamine (0.3) | 24 | 30 |
| 5 | 1 | 0.033 | BAI (0.2) | Ethylmethylamine (0.3) | 24 | 30 |
| 6 | 1 | 0.033 | BAI (0.2) | Ethanolamine (0.3) | 24 | 30 |
| 7 | 1 | 0.033 | BAI (0.2) | Ethylenediamine (0.3) | 24 | 30 |

Example 8: SCR Testing on Copper Exchanged Zeolite Catalysts

Synthesis of copper exchanged AFX: ~3% wt of copper exchanged into the calcined H-AFX zeolite using $Cu(CH_3COO)_2$.

Testing conditions: SV=90K, 500 ppm $NH_3$, 500 ppm NO, 4.6% $H_2O$, 14% $O_2$, 5% $CO_2$ in $N_2$. Ramp 5° C./min.

Procedures: Catalyst was initially exposed to full gas mixture with $NH_3$ for 10 min at 150° C. $NH_3$ was switched on and the catalyst was stabilized for 30 min to saturate. Catalyst was then evaluated during a 5° C./min ramp from 150 to 500° C. Catalyst was evaluated at steady state at 500° C. then cooled and evaluated again at steady state at 250° C.

FIG. 4 shows $NO_x$ conversions on fresh and aged at 900° C./5 h/4.5% $H_2O$ Cu.AFX, with ~3% wt of copper exchanged into the AFX zeolites.

FIG. 5 shows $N_2O$ selectivity of fresh and aged at 900° C./5 h/4.5% $H_2O$ 3.0% Cu.AFX. Cu.AFX catalyst of the present invention demonstrated high fresh SCR activities and high hydrothermal durability even at very high temperature 900° C.

The above examples are set forth to aid in the understanding of the invention, and are not intended and should not be construed to limit in any way the invention set forth in the claims which follow hereafter. Although illustrated and herein described with reference to certain specific embodiments, the present invention is nevertheless not intended to be limited to the details shown, but various modifications may be made therein without departing from the spirit of the invention.

What is claimed is:

1. A composition comprising a synthetic hydrogen-form zeolite having an AFX framework as the primary crystalline phase, wherein said zeolite is essentially free of alkali metal ions.

2. The composition of claim 1, wherein the zeolite has a silica-to-alumina ratio of about 22 to about 50.

3. The composition of claim 1, wherein the zeolite has a silica-to-alumina ratio of about 22 to about 40.

4. The composition of claim 1, wherein the zeolite has mean crystal size and a $D_{90}$ crystal size of about 0.1 to about 10 microns.

5. The composition of claim 1, wherein the zeolite has a hexagon and/or bipyramid morphology.

6. The composition of claim 1, wherein the as-made zeolite produces an XRD pattern having a hexagonal space group with a and c parameters that are different compared to a calcined sample and the X-ray characteristics of the as-made zeolite is as shown in Table 1 and the X-ray characteristics of the calcined zeolite is as shown in Table 2:

TABLE 1

Crystal structure of as-made H-AFX (JMZ-10)

| No. | Pos. [°2θ] | d-spacing [Å] | Rel. Int. [%] | h k l |
|---|---|---|---|---|
| 1 | 7.62 | 11.60 | 8 | 1 0 0 |
| 2 | 8.81 | 10.03 | 49 | 1 0 1 |
| 3 | 11.67 | 7.58 | 52 | 1 0 2 |
| 4 | 13.15 | 6.73 | 11 | 1 1 0 |
| 5 | 15.18 | 5.83 | 20 | 2 0 0 |
| 6 | 15.30 | 5.79 | 13 | 1 0 3 |
| 7 | 15.82 | 5.60 | 60 | 2 0 1 |
| 8 | 17.58 | 5.04 | 54 | 2 0 2 |
| 9 | 17.71 | 5.00 | 31 | 0 0 4 |
| 10 | 19.28 | 4.60 | 2 | 1 0 4 |
| 11 | 20.11 | 4.41 | 20 | 2 1 0 |
| 12 | 20.59 | 4.31 | 100 | 2 1 1 |
| 13 | 21.99 | 4.04 | 83 | 2 1 2 |
| 14 | 22.09 | 4.02 | 11 | 1 1 4 |
| 15 | 22.82 | 3.89 | 18 | 3 0 0 |
| 16 | 23.45 | 3.79 | 27 | 1 0 5 |
| 17 | 26.40 | 3.37 | 36 | 2 2 0 |
| 18 | 26.88 | 3.31 | 4 | 2 1 4 |
| 19 | 26.95 | 3.31 | 3 | 2 0 5 |
| 20 | 27.75 | 3.21 | 61 | 1 0 6 |
| 21 | 27.85 | 3.20 | 4 | 3 1 1 |
| 22 | 28.92 | 3.08 | 15 | 3 1 2 |
| 23 | 30.07 | 2.97 | 15 | 2 1 5 |
| 24 | 30.56 | 2.92 | 9 | 4 0 0 |
| 25 | 30.79 | 2.90 | 8 | 2 0 6 |
| 26 | 30.89 | 2.89 | 35 | 4 0 1 |
| 27 | 31.86 | 2.81 | 35 | 4 0 2 |

TABLE 2

Crystal structure of calcined H-AFX

| No. | Pos. [°2θ] | d-spacing [Å] | Rel. Int. [%] | h k l |
|---|---|---|---|---|
| 1 | 7.56 | 11.68 | 20 | 1 0 0 |
| 2 | 8.81 | 10.03 | 100 | 1 0 1 |
| 3 | 11.78 | 7.51 | 90 | 1 0 2 |
| 4 | 13.07 | 6.77 | 64 | 1 1 0 |
| 5 | 15.09 | 5.87 | 5 | 2 0 0 |
| 6 | 15.52 | 5.70 | 0 | 1 0 3 |
| 7 | 15.75 | 5.62 | 20 | 2 0 1 |
| 8 | 17.60 | 5.04 | 17 | 2 0 2 |
| 9 | 18.09 | 4.90 | 39 | 0 0 4 |
| 10 | 19.61 | 4.52 | 3 | 1 0 4 |
| 11 | 19.98 | 4.44 | 12 | 2 1 0 |
| 12 | 20.49 | 4.33 | 48 | 2 1 1 |
| 13 | 21.95 | 4.05 | 56 | 2 1 2 |
| 14 | 22.36 | 3.97 | 4 | 1 1 4 |
| 15 | 22.68 | 3.92 | 3 | 3 0 0 |

TABLE 2-continued

Crystal structure of calcined H-AFX

| No. | Pos. [°2θ] | d-spacing [Å] | Rel. Int. [%] | h k l |
|---|---|---|---|---|
| 16 | 23.90 | 3.72 | 14 | 1 0 5 |
| 17 | 26.24 | 3.39 | 29 | 2 2 0 |
| 18 | 27.05 | 3.29 | 2 | 2 1 4 |
| 19 | 27.30 | 3.26 | 2 | 2 0 5 |
| 20 | 27.71 | 3.22 | 3 | 3 1 1 |
| 21 | 28.30 | 3.15 | 36 | 1 0 6 |
| 22 | 28.82 | 3.09 | 6 | 3 1 2 |
| 23 | 30.36 | 2.94 | 5 | 2 1 5 |
| 24 | 30.38 | 2.94 | 11 | 4 0 0 |
| 25 | 30.72 | 2.91 | 28 | 4 0 1 |
| 26 | 31.27 | 2.86 | 6 | 2 0 6 |
| 27 | 31.74 | 2.82 | 22 | 4 0 2 |

7. A catalyst article for treating exhaust gas comprising a composition according to claim 1 disposed on and/or within a honeycomb monolith substrate.

8. A method for treating an exhaust gas comprising contacting a combustion exhaust gas containing $NO_x$ and/or $NH_3$ with a catalyst article according to claim 7 to selectively reduce at least a portion of the $NO_x$ into $N_2$ and $H_2O$ and/or oxidize at least a portion of the $NH_3$.

9. A method of synthesizing a zeolite comprising the steps of:
a. preparing an admixture comprising: (i) at least one source of alumina, (ii) at least one source of silica, (iii) a first structure directing agent (SDA) in hydroxide form suitable for forming an AFT cage as determined by either its use in the literature or by calculation of the energetics of the SDA in the AFT cage, and (iv) a second structure directing agent consisting of a neutral organic amine suitable for forming an GME cage as determined by either its use in the literature or by calculation of the energetics of the SDA in the AFT cage, wherein the admixture is essentially free of alkali metals;
b. heating the admixture under autogenous pressure at a temperature and with stirring or mixing for a sufficient time to crystalize hydrogen-form zeolite crystals having an AFX framework.

10. The method of claim 9, wherein the neutral organic amine is selected from isopropylamine, propylamine, ethanolamine, ethylmethylamine, ethylenediamine, pyrrolidine, cyclopropylamine, trimethylamine, and trimethylamine N-oxide.

11. The method of claim 10, wherein the first SDA is 1,3-Bis(1-adamantyl) imidazolium (BAI).

12. The method of claim 9, wherein the first SDA is 1,3-Bis(1-adamantyl) imidazolium (BAI).

13. A catalyst composition comprising a synthetic zeolite having an AFX framework as the primary crystalline phase and a silica-to-alumina ratio of about 22 to about 50, wherein the zeolite has 0.1 to 7 weight percent exchanged transition metal and wherein the zeolite is essentially free of alkali metal.

14. The catalyst composition of claim 13, wherein the transition metal is copper.

15. The catalyst composition of claim 13, wherein the transition metal is iron.

* * * * *